May 19, 1931. G. W. WILSON 1,805,748
DIRIGIBLE HEADLIGHT
Filed Feb. 18, 1930 3 Sheets-Sheet 2
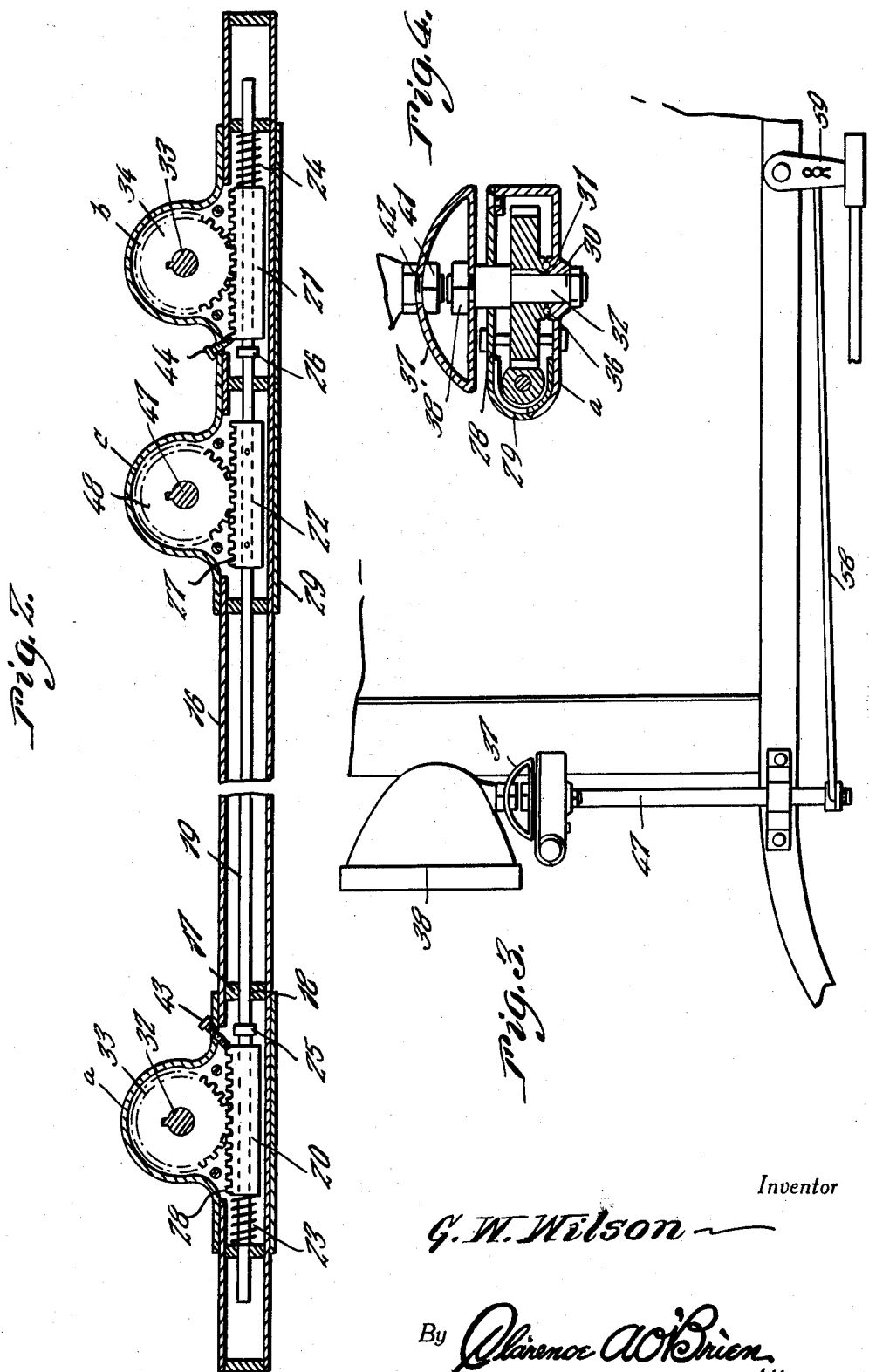
Inventor
G. W. Wilson
By Clarence A. O'Brien
Attorney May 19, 1931.　　　G. W. WILSON　　　1,805,748
DIRIGIBLE HEADLIGHT
Filed Feb. 18, 1930　　　3 Sheets-Sheet 3
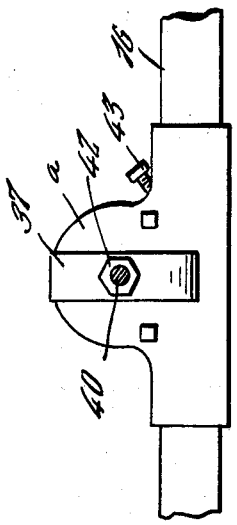
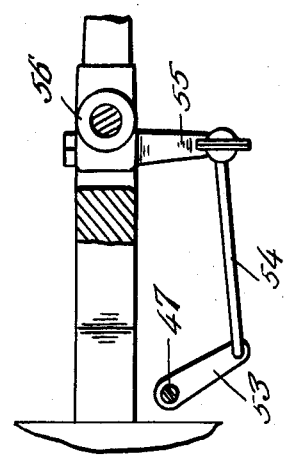
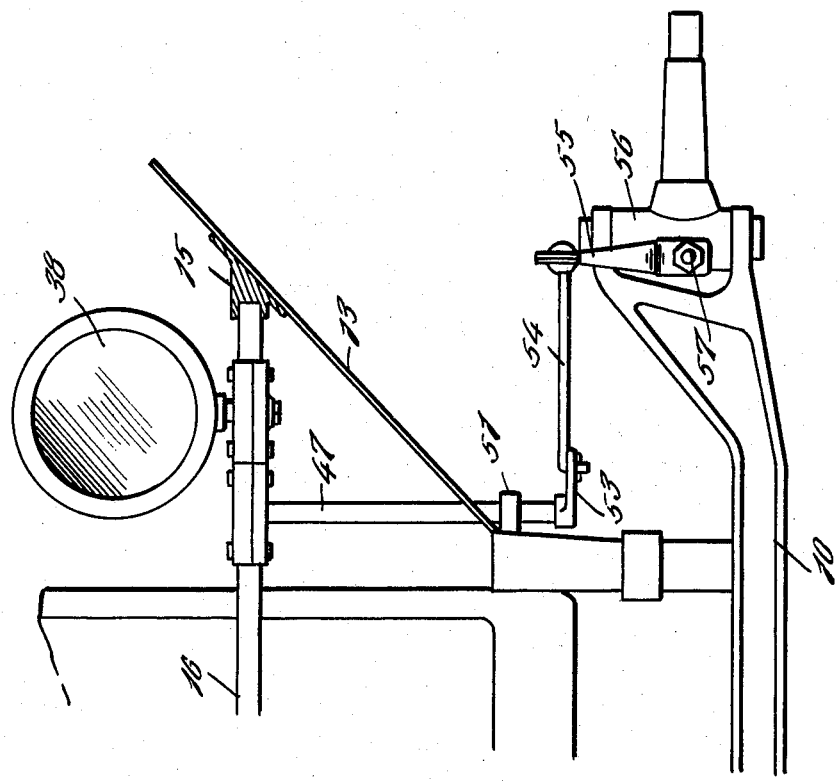
Inventor
G. W. Wilson
By Clarence A. O'Brien
Attorney Patented May 19, 1931

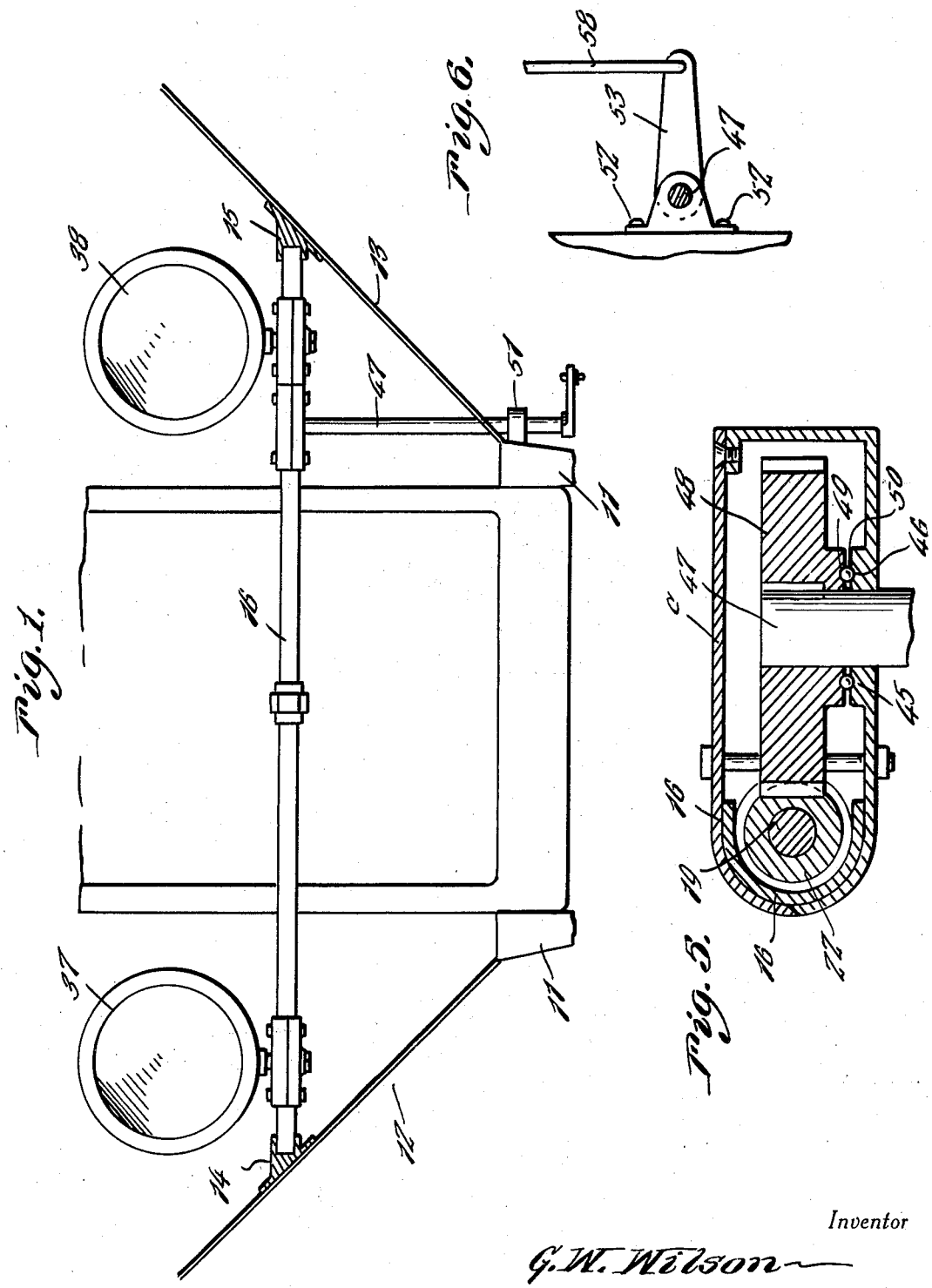

1,805,748

UNITED STATES PATENT OFFICE

GEORGE W. WILSON, OF CANFIELD, OHIO

DIRIGIBLE HEADLIGHT

Application filed February 18, 1930. Serial No. 429,248.

This invention relates to dirigible headlights, and an object of the invention is to enable the driver to see the road ahead of him on curves and in turning corners.

Another feature of the invention is to provide a working automobile headlight automatically, and in unison with the steering apparatus of an automobile or other power driven vehicle, in such a manner, that at least one lamp is casting its rays in the direction at which the front wheels are turned, instead of directly in front of the body of the car as is now customarily the practice.

Further objects of the invention are to provide dirigible headlights of the character referred to that may be applied to the main headlights, of the vehicle or to an extra lamp attached to the headlight cross bar, running board, or other convenient place as desired, and to further provide a dirigible headlight that is strong, compact and durable, thoroughly reliable for its intended purpose, very simple in its method of assembly and comparatively inexpensive to manufacture and operate.

With the foregoing and other objects in view, the invention consists of a novel construction, combination and arrangement of parts as will be hereinafter more specifically described and illustrated in the accompanying drawings, wherein is disclosed an embodiment of the invention, but it is to be understood that changes, variations and modifications may be resorted to without departing from the spirit of the claims as hereto appended.

In the drawings where like references denote corresponding parts throughout the several views:—

Figure 1 is a fragmentary front elevation of an automobile fitting an adaptation of the dirigible headlight in the present invention connected therewith.

Fig. 2 is a horizontal detailed section thru the cross tube.

Fig. 3 is a fragmentary side elevation of an automobile showing the present invention applied thereto.

Fig. 4 is a detailed vertical section taken substantially on the line 4—4 of Fig. 1.

Fig. 5 is a vertical detailed section taken substantially on the line 5—5 of Fig. 1.

Fig. 6 is a horizontal section taken substantially on the line 6—6 of Fig. 3.

Fig. 7 is an enlarged front elevation of an automobile illustrating a modified form of operating the drive shaft.

Fig. 8 is a horizontal section taken substantially on the line 8—8 of Fig. 7, and Fig. 9 is a horizontal section taken substantially on the line 9—9 of Fig. 7.

Referring to the drawings in detail, 10 indicates generally the front axle of an automobile upon which is supported the chassis bars that support the body of an automobile. Rising diagonally from the chassis bars 11 are the conventional front fenders 12, 13. Secured to the inner faces of each fender 12, 13, in alined relation with each other, are a pair of socket brackets 14, 15 in which are supported the opposite ends of a horizontally disposed, transversely extending tubular rod indicated generally at 16. The tubular rod 16, extends across the front of the radiator between the fenders, and not only forms braces for the fenders, but provides a support for the headlight of the same to be presently described.

Supported vertically within the interior of the tubular rod 16, are a plurality of bearing partitions 17, each of which is formed with central openings 18. A single drive rod 19 is mounted interiorly of the tubular member 16, concentric with respect thereto. This rod 19 is movably supported in the openings 18 in the plurality of partition bearings 17. The rod 19 is of less length than the length of the tube 16 so as to allow movement of the rod without abutting against the end wall of the tube.

Adjacent each end of the rod 19, there is loosely mounted thereon rack sleeves 20, 21 and intermediate these two sleeves, there is fixed to the rod, a third sleeve 22. Between the outer end of the outer sleeves, 20, 21, there is mounted on the rod 19 a pair of coil springs 23, 24. The inner ends of these springs, abut against the outer ends of the sleeves 20—21 and the outer ends of the springs abut against the end partition bearings 17, so as to normally urge the sleeves inwardly, and to take up lateral thrust in these sleeves.

When the headlights, to be presently described, are in straight position, the inner ends of the sleeves 20, 21 are spaced slightly outwardly from collars 25, 26, secured to the rod 19. By spacing the collars 25, 26 inwardly from the inner end of the sleeves, there is provided a certain amount of play for the rod 19, without turning the headlights.

Each of the sleeves is formed with rearwardly directed teeth 27, coextensive with the length of the sleeves for engagement with pinions to be presently described. The tubular rod 16 rearwardly of the sleeves 20, 21 and 22, is formed with three slots slightly longer than the sleeves.

Rearwardly of the outer sleeves 20, 21, and intermediate sleeve 22 there are three substantially semi-circular gear housings indicated at $a$, $b$, and $c$. The forward portion of each housing terminates in a sleeve 29 that clamps about the tubular rod 16 by which the housings are supported on the tubular rod. The sleeves are disposed about the slots 28 in the tubular rod 16 so that the slots communicate with the interior of the gear housings.

In the bottom wall of each gear housing $a$, $b$, and $c$, there is an apertured boss, having a circular ball race 31 in its upper face. In the end gear housings $a$ and $b$ there are vertical stub shafts 32, 33 the lower ends of which are journaled in the apertured bosses 30 and the upper ends extend through the top walls of the gear housings.

Keyed to the stub shafts 32 and 33 in the gearing housings $a$ and $b$ are pinions 34 and 35, that engage with the teeth 27 on the outer sleeves 20, 21. The bottoms of these pinions are provided with ball races 35, to ride over ball bearings 36 in the ball races 31 on the bosses 30. The upper end of each stub shaft 32, 33 is secured to the chord wall of a horizontally disposed, hollow segmental-shaped lamp socket 37, by means of a nut 38, threadably engaging the ends of these shafts.

There is one of these lamp brackets, 37, for each lamp. The headlight lamps 37, 38 have depending threaded pins 40 extending through openings in the arcuate sides of the brackets, 37, and on each of the pins, are a pair of nuts 41, 42 that bear against the opposed faces of the arcuate sides of the brackets, for adjusting the height of the lamps.

Threadably supported on the walls of the gear housings $a$ and $b$, are stud bolts 43, 44, the inner ends of which project into the tubular members 16 in the path of the sleeves 20, 21. These grooves are positioned to provide a limit for the inward movement of the sleeves, to support the lamps in longitudinal alinement with the bottom of the car, when the wheels are straight.

The intermediate gear housing $c$, also has an apertured boss 45 on its bottom wall in the upper face of which is provided an annular ball race 46. The upper end of the vertical drive shaft 47 passes through the boss 45, and to this upper end is keyed the driving pinion 48.

The lower face of the pinion 48 is provided with an annular ball race 49 to receive the ball bearings 50. The teeth of the pinion 48, engage with the fixed sleeve 22 by which the rod 19 is moved. Adjacent the lower end the drive shaft 47 is rotatably supported on a U-shaped bracket 51, the ends of which are anchored by means of bolts 52 to the sides of the chassis bar 11.

To the lower end of drive shaft 47 is secured a laterally projecting crank arm 53.

In the form of the invention shown in Figs. 7 and 9 of the drawings, a link 54 has one end secured to the free end of the crank arm 53 while the other end is secured to an arm 55. The inner end of the arm 55 is connected directly to the spindle 56 by means of a bolt 57. In this form of the invention, the turning of the spindle, will cause the drive shaft 47 to move to the right or to the left.

In the form of the invention shown in Figs. 3 and 6, there is a link 58 that extends rearwardly from the outer end of crank arm 53. The one end of the link 58 is connected through the outer end of crank arm 53, the other end of the link being connected to the steering arm 59 where it projects out of the chassis frame.

From the foregoing it will be seen that movement of the front wheel will always turn the lamp nearer the edge of the road in the direction that the car is being turned. If the car is turned to the left, the left hand lamp 37 is moved to the left, the left hand lamp being moved by the sleeve 20. Collar 25, on rod 19, abuts against the inner end of the sleeve and forces it outward against the tension of the spring 23.

It will be seen that rod 19 moves to the left, since sleeve 21 is movably coupled thereto, but since sleeve 21 is held by set screws 44, the right hand light will be positioned straight ahead.

When the wheels are turned to the right, the reverse operation is accomplished, whereby the left hand light is straight ahead while the right hand light is projected in the direction that the wheels are turned.

The present embodiment of the invention has been disclosed in considerable detail merely for the purpose of exemplification since in actual practice it attains the features of advantage enumerated as desirable in the statement of the invention, and the above description.

It is to be understood that by describing in detail herein any particular form, structure, or arrangement, it is not intended to limit the invention beyond the terms of the several claims, or the requirements of the prior art.

Having thus described my invention, what I claim as new is:—

1. In combination with an automobile including a steering gear, a hollow transverse bar, a rod movably supported within the bar, gear casings supported on said bar, stub shafts mounted in certain of said casings, a drive shaft journaled in another of said casing, gears mounted on the drive shaft and stub shafts, means on the rods engageable with one stub shaft for turning said one stub shaft while the other stub shaft is stationary, means connecting the drive shaft within the steering gear to move said rod in either direction, said means on the rod movably supported thereon, and a limit stop on the gear casings supporting the lamp for said last-mentioned means.

2. In combination with an automobile including a steering gear, a hollow transverse bar, a rod movably supported within the bar, gear casings supported on said bar, stub shafts mounted in certain of the said casings, a drive shaft journaled in another of said casings, gears mounted on the drive shaft and stub shaft for turning said one stub shaft while the other stub shaft is stationary, means connecting the drive shaft within the steering gear to move said rod in either direction, said means on the rod movably supported thereon, a limit stop on the gear casings supporting the lamp for said last-mentioned means, and resilient means in engagement with the last-mentioned means for holding the headlights straight ahead.

In testimony whereof I affix my signature.

GEORGE W. WILSON.